(12) United States Patent
Yu et al.

(10) Patent No.: US 6,355,325 B2
(45) Date of Patent: Mar. 12, 2002

(54) UNSATURATED CARBONATE ADHESIVES FOR COMPONENT SEAMS

(75) Inventors: Robert C. U. Yu, Webster; Constance J. Thornton, Ontario; William A. Hammond; Edward L. Schlueter, Jr., both of Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/903,949

(22) Filed: Jul. 12, 2001

Related U.S. Application Data

(62) Division of application No. 09/088,011, filed on Jun. 1, 1998.

(51) Int. Cl.[7] ................................................ B32B 3/00
(52) U.S. Cl. ........................................................ 428/57
(58) Field of Search ............................ 428/57–59, 355; 430/17, 58, 59; 156/304.1

(56) References Cited

U.S. PATENT DOCUMENTS

| | | | |
|---|---|---|---|
| 4,265,990 A | 5/1981 | Stolka et al. | 430/59 |
| 4,780,385 A | 10/1988 | Wieloch et al. | 430/58 |
| 5,114,818 A | 5/1992 | Yu | 430/97 |
| 5,487,707 A | 1/1996 | Sharf et al. | 474/253 |
| 5,514,436 A | 5/1996 | Schlueter, Jr. et al. | 428/57 |
| 5,549,193 A | 8/1996 | Schlueter, Jr. et al. | 198/844.2 |
| 5,571,649 A | 11/1996 | Mishra et al. | 430/59 |
| 5,721,032 A | 2/1998 | Parker et al. | 428/57 |

*Primary Examiner*—Harold Pyon
*Assistant Examiner*—Sow-Fun Hon
(74) *Attorney, Agent, or Firm*—Robert Thompson

(57) ABSTRACT

An unsaturated carbonate adhesive for use in bonding seams of endless flexible seamed belts, sheets or films, and preferably for use with puzzle cut seams.

18 Claims, 7 Drawing Sheets

UNSATURATED CARBONATE ADHESIVES FOR COMPONENT SEAMS

CROSS REFERENCE TO RELATED APPLICATIONS

This application is a divisional of application Ser. No. 09/088,011, filed Jun. 1, 1998.

Attention is directed to copending U.S. patent application Ser. No. 08/522,622 (D/93563) entitled "Puzzle Cut Seamed Belt with Strength Enhancing Strip," now continuing U.S. patent application Ser. No. 08/522,622, filed Aug. 31, 1995; U.S. patent application Ser. No. 08/297,203 (D/94227) entitled "Puzzle Cut Seamed Belt with Bonding Between Adjacent Surfaces;" and U.S. patent application Ser. No. 08/004,636 (D/97525) entitled "Process and Apparatus for Producing an Endless Seamed Belt". The disclosures of these references are hereby incorporated by reference in their entirety.

BACKGROUND OF THE INVENTION

The present invention is directed to an endless flexible seamed belt having improved seam quality and smoothness with substantially no thickness differential between the seamed portion of the belt and the adjacent main body of the belt, and having a strength enhancing bond formed in voids between mutually mating elements of the belt of a material which is chemically and physically compatible with the material of the coating layers of the belt. In embodiments, the present invention relates to xerographic components comprising an adhesive formed between mutually mating elements of a seam, wherein the adhesive comprises an unsaturated carbonate material. The present invention, in embodiments, allows for relatively fast preparation and manufacture of xerographic components which reduces seam fabrication cycle time. In addition, the adhesive is compatible with the belt materials including, in preferred embodiments, a polyester substrate, a transport layer, and anti-curl back coating. Further, in embodiments, the seam has a decreased surface roughness which results in a decrease in cleaning blade wear, an increase in cleaning efficiency, and greater stability in belt cycling motion quality. In addition, in embodiments, the seam shape is superior in continuity resulting in a decrease in cracking and delamination failure problems. Furthermore, the seam has increased seaming bonding strength to decrease tearing as well as enhance the seam's tensile rupture resistance. Moreover, in embodiments, the seam has a decreased inherent and virtually nil seam height which allows for superior cleaning efficiency and superior hybrid scavengeless development efficiency. Furthermore, the adhesive chosen to bond the ends of the belt crosslinks, resulting in little or no shrinkage at the crevice of the seam.

In a typical electrostatographic reproducing apparatus such as electrophotographic imaging system utilizing a photoreceptor, a light image of an original to be copied is recorded in the form of an electrostatic latent image upon a photosensitive member and the latent image is subsequently rendered visible by the application of electroscopic thermoplastic resin particles which are commonly referred to as toner. Generally, the electrostatic latent image is developed by bringing a developer mixture into contact therewith. Toner particles are attracted from the carrier granules to the latent image forming a toner powder image thereon. Alternatively, a liquid developer material may be employed. After the toner particles have been deposited on the photoconductive surface, in image configuration, the developed image is transferred to a receiving copy substrate. The image is subsequently fused to a copy substrate by the application of heat in combination with pressure.

Belts, sheets, films and the like are important to the xerographic process. In addition, belt function is very much affected by the seam of the belt. For example, belts formed according to known butting or overlapping techniques provide a bump or other discontinuity in the belt surface leading to a height differential between adjacent portions of the belt, of 0.010 inches or more depending on the belt thickness, which leads to performance failure in many applications. A bump, surface irregularity, or other discontinuity in the seam of the belt may disturb the tuck of the cleaning blade as it makes intimate contact with the photoconductive member surface to effect residual toner and debris removal. This may allow toner to pass under the blade and not be cleaned. Furthermore, seams having differential heights may when subjected to repeated striking by cleaning blades, cause photoconductive member cycling speed disturbance which affects the crucial photoconductive belt motion quality. Moreover, seams with a bump or any morphological defects can facilitate the untransferred, residual toner to be trapped in the sites of seam surface irregularities. The seam of a photoreceptor belt which is repeatedly subjected to the striking action by a cleaning blade under machine functioning conditions has triggered the development of pre-mature seam delamination failure. As a result, both the cleaning life of the blade and the overall service life of the photoreceptor belt can be greatly diminished. In addition, the copy quality of image printout can be degraded. Moreover, such irregularities in seam height provide vibrational noise in xerographic development which disturb the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet. In addition, the discontinuity in belt thickness due to the presence of an excessive seam height yields variances of mechanical strength in the belt as well as reducing the fatigue flex life of the seam when cycling over the belt module support rollers. Further, the seam discontinuity or bump in such a belt may result in inaccurate image registration during development, inaccurate belt tracking and overall deterioration of motion quality, as a result of the translating vibrations.

U.S. Pat. No. 5,487,707 relates to an endless flexible seamed belt comprising puzzle cut members, and further comprising a bonding between adjacent surfaces by an ultraviolet cured adhesive.

U.S. Pat. No. 5,514,436 relates to an endless flexible seamed belt having puzzle cut seams and wherein the seam is of a substantially uniform thickness as the rest of the belt.

U.S. Pat. No. 5,549,193 relates to an endless flexible seamed belt formed comprising puzzle cut members, wherein at last one receptacle has a substantial depth in a portion of the belt material at the belt ends.

Although the above references teach interlocking seams which provide for decreased inherent seam height, increased seam strength, decreased surface roughness at the seam, and increased continuity at the seam, there still exists a need for a seam which has increased seam bonding strength to prevent premature delamination, tearing or rupture. Further, there exists a need for a flexible belt having a seam, wherein the belt is thin and has improved surface profile to suppress force cleaning blade/seam interaction as well as eliminate residual toner/debris/dirt entrapping. In addition, it is desired to provide a belt which is easily and speedily fabricated. There further exists a need for an adhesive seaming material which is compatible with the belt materials, including the substrate and the outer layer(s) and, in preferred embodiments, is useful for flexible photoreceptor belts employing seams such as, for example, puzzle cut seams. Moreover, it is desired to provide a seam with virtual nil thickness differential with the main body of the belt, as well as a belt with good tensile and bending flexibility. Furthermore, it is desired to provide an adhesive, which when placed in the crevice between belt ends, will result in little or no shrinkage.

SUMMARY OF THE INVENTION

Embodiments of the present invention include: an endless seamed flexible belt comprising a first end and a second end together which form a seam, wherein said seam comprises an unsaturated carbonate adhesive material having the following Formula I: $R_1$—O—$CO_2$—$R_2$—O—$R_2$—$CO_2$—O—$R_1$, wherein $R_1$ is an unsaturated chain having from about 2 to about 40 carbon atoms, and wherein $R_2$ is different from $R_1$ and is selected from the group consisting of a) a nonsubstituted aliphatic chain having from about 1 to about 50 carbon atoms, b) a substituted aliphatic chain having from about 1 to about 50 carbon atoms, c) an unsustituted aromatic group having form about 6 to about 30 carbon atoms, d) a substituted aromatic group having from about 6 to about 30 carbon atoms, e) unsubstituted heterocyclic group having from about 3 to about 40 carbons, and f) substituted heterocyclic group having from about 3 to about 40 carbons, wherein said substitutents are selected from the group consisting of aliphatic groups having from about 1 to about 50 carbons, cycloaliphatic groups having from about 3 to about 28 carbons, halides, aromatic groups having from about 6 to about 30 carbons, nitro groups, amino groups, amido groups, cyano groups, and sulfonyl groups.

In addition, embodiments include: an endless seamed flexible belt comprising a first end and a second end together which form a seam, wherein said seam comprises an unsaturated carbonate adhesive material having the following Formula II:

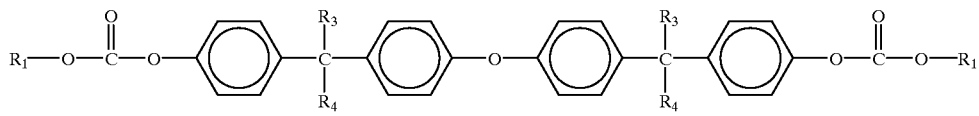

wherein $R_1$ is an unsaturated chain having from about 2 to about 40 carbon atoms, and $R_3$ and $R_4$ are the same or different and are selected from the group consisting of a) an unsubstituted aliphatic group having from about 1 to about 50 carbon atoms, and b) a substituted aliphatic group having from about 1 to about 50 carbon atoms, wherein the substitutents are selected from the group consisting of aliphatic groups having from about 1 to about 50 carbons, cycloaliphatic groups having from about 3 to about 28 carbon atoms, halides, aromatic groups having from about 6 to about 30 carbons, nitro groups, amino groups, amido groups, sulfonyl groups, and cyano groups.

Embodiments also include: an endless seamed flexible photoreceptor belt comprising a substrate comprising polyester, an outer layer comprising polycarbonate and positioned on an upper side of said substrate, and a backing layer comprising polycarbonate and positioned on an underside of said substrate, wherein said belt further comprises a first end and a second end together forming a seam, said seam comprising an unsaturated carbonate adhesive material having the following Formula I: $R_1$—O—$CO_2$—$R_2$—O—$R_2$—$CO_2$—O—$R_1$, wherein $R_1$ is an unsaturated chain having from about 2 to about 40 carbon atoms, and wherein $R_2$ is different from $R_1$ and is selected from the group consisting of a) a nonsubstituted aliphatic chain having from about 1 to about 50 carbon atoms, b) a substituted aliphatic chain having from about 1 to about 50 carbon atoms, c) an unsubstituted aromatic group having form about 6 to about 30 carbon atoms, d) a substituted aromatic group having from about 6 to about 30 carbon atoms, e) unsubstituted heterocyclic group having from about 3 to about 40 carbons, and f) substituted heterocyclic group having from about 3 to about 40 carbons, wherein said substitutents are selected from the group consisting of aliphatic groups having from about 1 to about 50 carbons, cycloaliphatic groups having from about 3 to about 28 carbons, halides, aromatic groups having from about 6 to about 30 carbons, nitro groups, amino groups, amido groups, cyano groups, and sulfonyl groups.

Moreover, embodiments include: an image forming apparatus for forming images on a recording medium comprising: a charge-retentive surface to receive an electrostatic latent image thereon, wherein said charge-retentive surface comprises an endless seamed flexible belt comprising a first end and a second end together forming a seam, wherein said seam comprises an unsaturated carbonate adhesive having the following Formula I: $R_1$—O—$CO_2$—$R_2O$—$R_2$—$CO_2$—O—$R_1$, wherein $R_1$ is an unsaturated chain having from about 2 to about 40 carbon atoms, and wherein $R_2$ is different from $R_1$ and is selected from the group consisting of a) a nonsubstituted aliphatic chain having from about 1 to about 50 carbon atoms, b) a substituted aliphatic chain having from about 1 to about 50 carbon atoms, c) an unsubstituted aromatic group having form about 6 to about 30 carbon atoms, d) a substituted aromatic group having from about 6 to about 30 carbon atoms, e) unsubstituted heterocyclic group having from about 3 to about 40 carbons, and f) substituted heterocyclic group having from about 3 to about 40 carbons, wherein said substituents are selected from the group consisting of aliphatic groups having from about 1 to about 50 carbons, cycloaliphatic groups having from about 3 to about 28 carbons, halides, aromatic groups having from about 6 to about 30 carbons, nitro groups, amino groups, amido groups, cyano groups, and sulfonyl groups; a development component to apply toner to said charge-retentive surface to develop said electrostatic latent image to form a developed image on said charge retentive surface; a transfer film component to transfer the developed image from said charge retentive surface to a copy substrate; and a fixing component to fuse said developed image to said copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having improved adhesion at the seam, increased bonding strength, and virtual uniform thickness at the seam. In addition, an improved adhesive, embodiments of which are discussed herein, provides for increased solidification thereby reducing seam fabrication cycle time. In preferred embodiments, the belt is a photoreceptor belt, sheet, or film useful in xerographic, including digital, apparatuses. However, the belts herein having a seam comprising an unsaturated carbonate adhesive, can be useful as belts for many different processes and components such as photoreceptors, intermediate transfer members, fusing members, transfix members, bias transfer members, bias charging members, developer members, image bearing members, conveyor members, and other members for contact electrostatic printing applications, xerographic applications, including digital, and the like.

The present invention allows for a seamed belt whereby the seam height is relatively uniform with the rest of the belt, and wherein the seam does not interfere to any great extent with any operation performed thereon.

Figure 1:
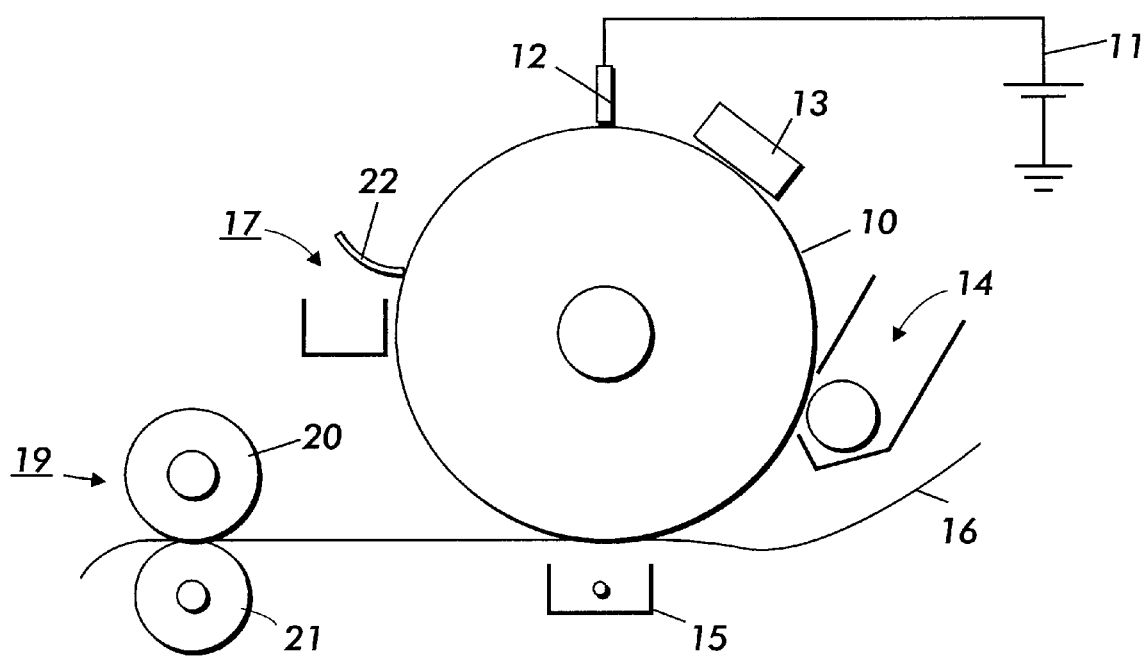
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
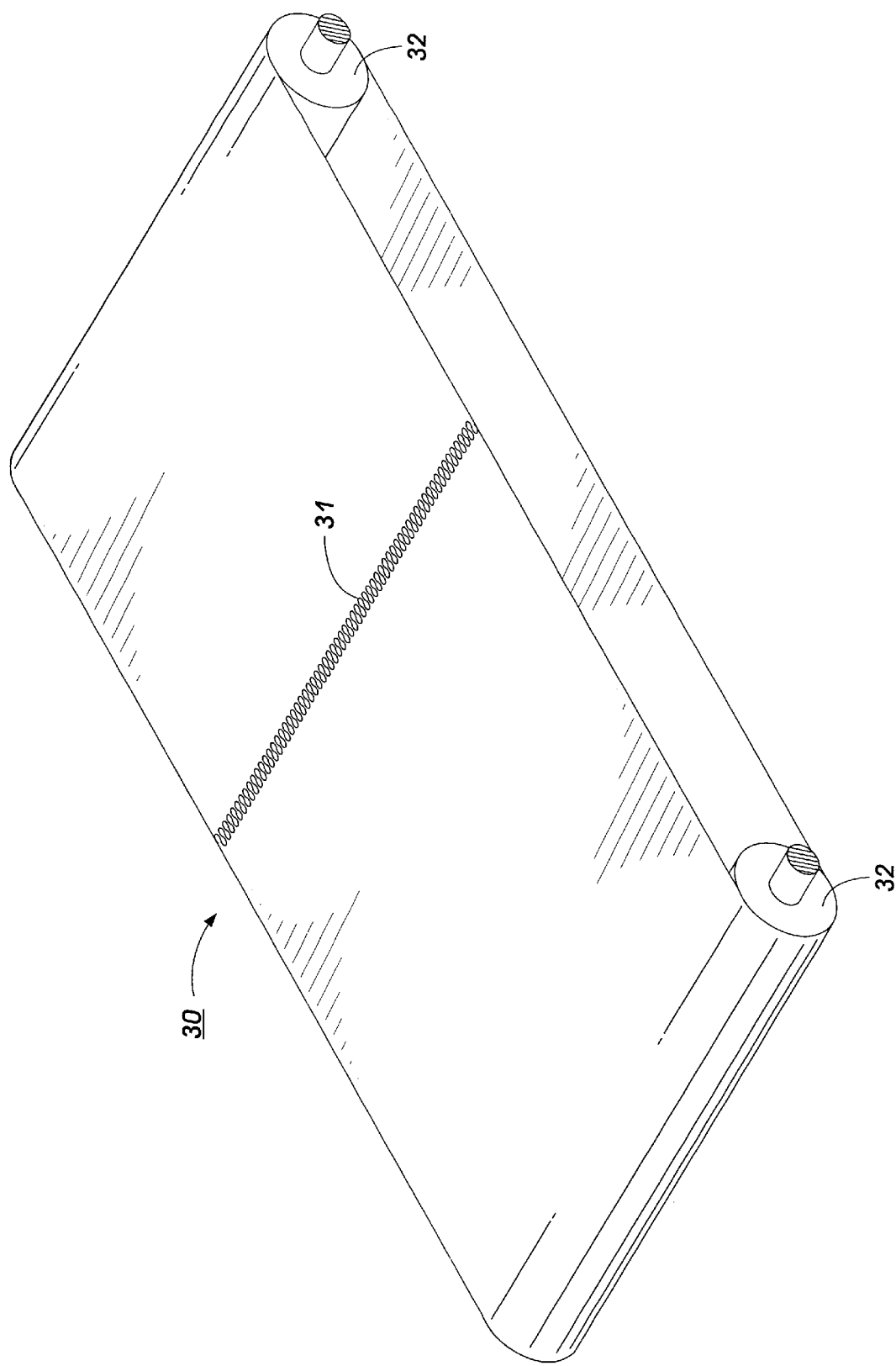
FIG. 2 is an enhanced view of an embodiment of a belt configuration and seam according to the present invention.

FIG. 2 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two dimensional plane when the belt 30 is on a flat surface, whether it be horizontal or vertical. While the seam is illustrated in FIG. 2 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In a preferred embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by an unsaturated carbonate adhesive, which provides improved seam quality and smoothness with substantially no thickness differential between the seam and the adjacent portions of the belt. This improved belt provides enhanced imaging, registration and control as discussed above. In this regard, it should be noted that the lower the differential in seam height, the less the mechanical action force against a cleaning blade and machine subsystems. Therefore, the traveling speed variance is lessened.

Figure 3:
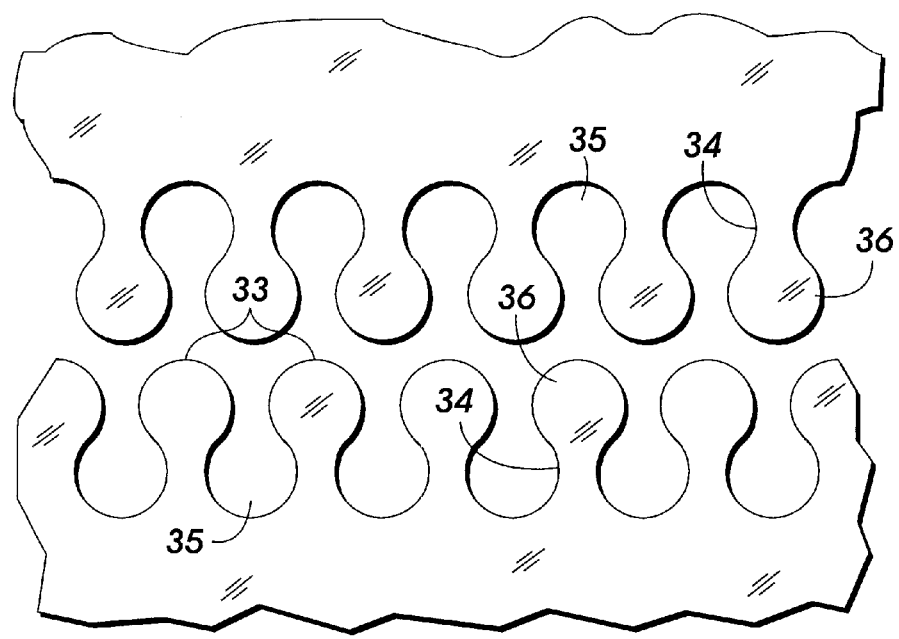
FIG. 3 is an enlargement of a puzzle cut seam having a head and neck members according to one embodiment of the present invention.

An example of an embodiment of a puzzle cut seam having two ends, each of the ends comprising puzzle cut members or mutually mating elements is shown in FIG. 3.

Figure 4:
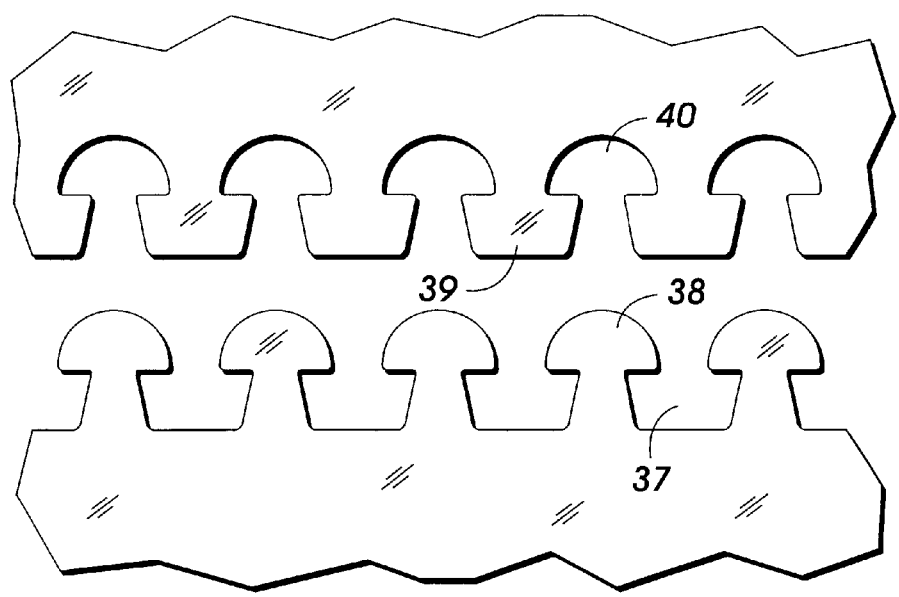
FIG. 4 is an enlargement of a puzzle cut seam having mushroom-shaped puzzle cut members according to another embodiment of the present invention.
Figure 5:
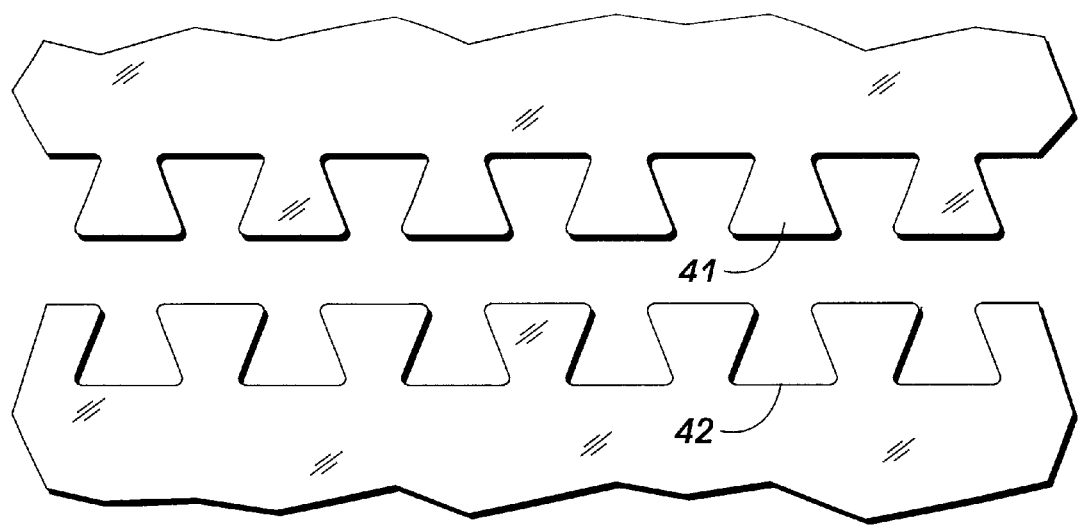
FIG. 5 is an enlargement of a puzzle cut seam having dovetail members according to another embodiment of the present invention.
Figure 6:
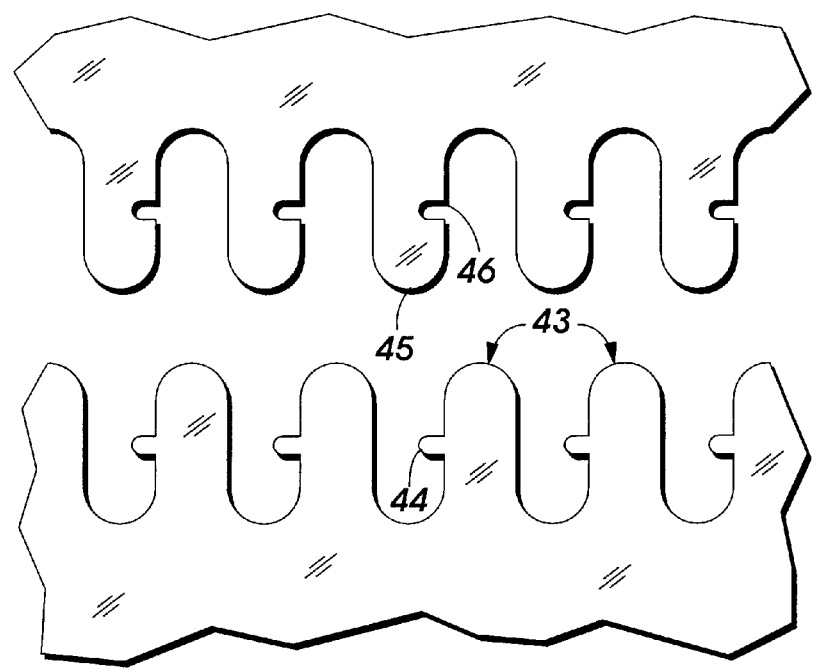
FIG. 6 is an enlargement of a puzzle cut seam having recessor and teeth members according to another embodiment of the present invention.

The puzzle cut pattern may take virtually any form, including that of nodes such as identical post or neck 34 and head 33 or node patterns having projections 36 and receptacles 35 which interlock when brought together as illustrated in FIG. 3. The puzzle cut pattern may also be of a more mushroom-like shaped pattern having first projections 38 and 39 and second receptacles 40 and 37 as illustrated in FIG. 4, as well as a dovetail pattern as illustrated in FIG. 5 having first projections 41 and second receptacles 42. The puzzle cut pattern illustrated in FIG. 6 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress concentration between the interlocking elements and permit them to separate when traveling around curved members such as the rolls 32 of FIG. 2. It has been found that with curved mating elements that the stress concentration is lower than with square corners where rather than the stress being uniformly distributed it is concentrated leading to possible failure.

Figure 7:
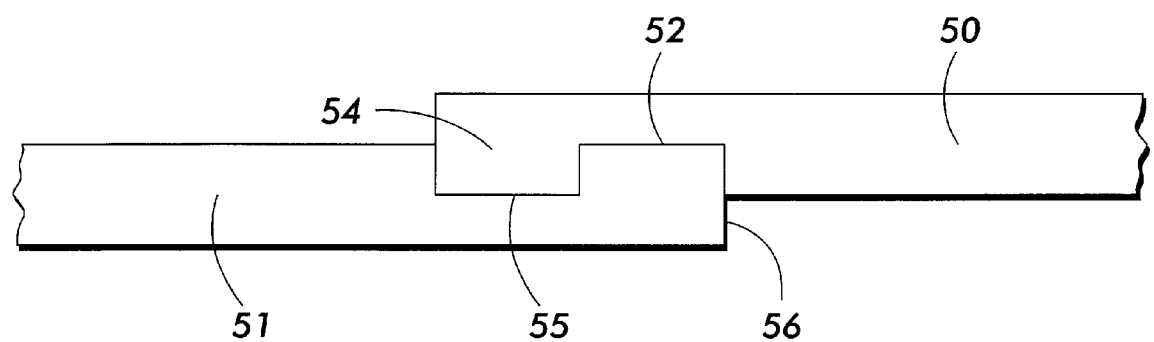
FIG. 7 is an enlargement of a puzzle cut seam having receptacle and projection members of differing depth according to another embodiment of the present invention.

Another example of a puzzle cut seam is shown in FIG. 7 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

It is preferred that the height differential between the seam and the rest of the belt (the nonseamed portions of the belt) be practically nil, or from about 0 to about 25 micrometers, preferably from about 0.0001 to about 25 micrometers, and particularly preferred of from about 0.01 to about 15 micrometers.

Figure 8:
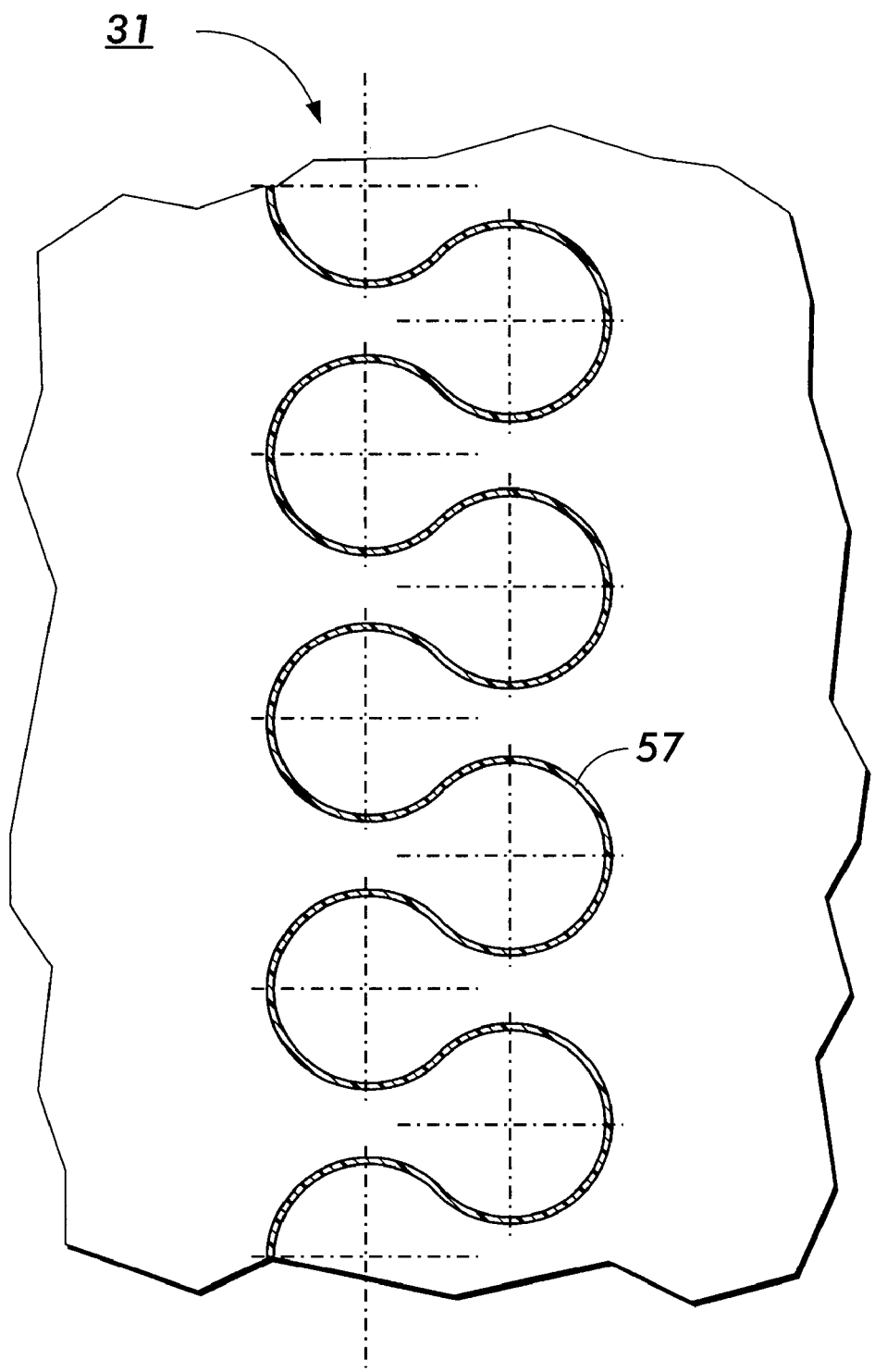
FIG. 8 is an enlarged version of a belt according to one embodiment of the present invention and demonstrates a crevice between the puzzle cut members, the crevice containing an adhesive.

An adhesive is preferably present between the seam, and placed in the crevice between the puzzle cut members to a thickness of from about 0.0001 about 25 micrometers. As shown in one embodiment of a puzzle cut seam 31 according to the present invention, the adhesive is present between the puzzle cut members and at the seam crevice 57 of FIG. 8.

A preferred adhesive for use with a belt seam, preferably a puzzle cut belt seam, is an unsaturated adhesive, and in preferred embodiments, an unsaturated carbonate adhesive. In a particularly preferred embodiment, the unsaturated carbonate adhesive is a diglycol adhesive, and preferably is an allyl diglycol adhesive. In embodiments, the unsaturated carbonate adhesive has the following Formula I: $R_1$—O—$CO_2$—$R_2$—O—$R_2$—$CO_2$—O—$R_1$, wherein $R_1$, is an unsaturated chain having, for example, from about 2 to about 40 carbon atoms, preferably from about 2 to about 20 carbon atoms, and particularly preferred from about 2 to about 10 carbon atoms, such as methylene, ethene, propene, butene, pentene, hexene, heptene, octene, nonene, decene and the like, and ethyne, propyne, butyne, pentyne, hexyne, heptyne, octyne, nonyne, decyne, and the like; and wherein $R_2$ is different from $R_1$ and is selected from the group consisting of a) substituted or unsubstituted aliphatic group having, for example, from about 1 to about 50 carbon atoms, preferably from about 1 to about 25 carbon atoms, and particularly preferred from about 1 to about 12 carbon atoms such as, for example, methyl, ethyl, propyl, butyl, penyl, hexyl, heptyl, octyl, nonyl, decyl and the like, wherein the substituents include any appropriate group such as aliphatic groups having, for example from about 1 to about 50 carbons, preferably from about 1 to about 25 carbons, and particularly preferred from about 1 to about 12 carbons such as methyl, ethyl, propyl, butyl, penyl, hexyl, heptyl, octyl, nonyl, decyl and the like, substituted or unsubstituted cycloaliphatic groups having, for example, from about 3 to about 28 carbon atoms, preferably from about 3 to about 16 carbon atoms such as, for example, cyclopropyl, cyclobutyl, cyclopentyl, cyclohexyl, cycloheptyl, cyclooctyl, cyclononyl, cyclodecyl, and the like, halides such as bromo, chloro, fluoro, iodo, and the like, substituted or unsubstituted aromatic groups having, for example, from about 6 to about 30 carbons, preferably from about 6 to about 18 carbon atoms such as cyclohexene, cyclohexadiene, cyclohexatriene, benzene and the like, nitro groups, amino groups, amido groups, sulfonyl groups, cyano groups, and the like; b) substituted or unsubstituted aromatic group such as those having, for example, from about 6 to about 30 carbons, preferably from about 6 to about 18 carbon atoms, wherein the substituents include substituted or unsubstituted aliphatic groups such as those having, for example, from about 1 to about 50 carbons, preferably from about 1 to about 25 carbon atoms, halides, substituted or unsubstituted cycloaliphatic groups having from about 3 to about 28 carbons, substituted or unsubstituted aromatic groups having from about 6 to about 30 carbons, nitro groups, amino groups, amido groups, cyano groups, sulfonyl groups, and the like; and c) substituted or unsubstituted heterocyclic groups such as those having, for example, from about 3 to about 40 carbon atoms, preferably from about 4 to about 20 carbon atoms, such as pyridine, quinoline, indole, thiophene, phenol, cresol, naphthol, and the like, wherein the substituents are selected from aliphatic groups such as those having, for example, from about 1 to about 50 carbons, halides, cycloaliphatic groups having from about 3 to about 28 carbons, aromatic groups having from about 6 to about 30 carbons, nitro groups, amino groups, amido groups, cyano groups, sulfonyl groups, and the like.

In a preferred embodiment, $R_1$ is selected from the group consisting of alkenyl having from about 2 to about 50 carbons, preferably from about 2 to about 25 carbon atoms and particularly preferred from about 2 to about 12 carbon atoms, and an alkynyl having from about 2 to about 50 carbon atoms, preferably from about 2 to about 25 carbon atoms and particularly preferred from about 2 to about 12 carbon atoms, and $R_2$ is selected from the group consisting of a) unsubstituted aliphatic group having from about 1 to about 50 carbon atoms, preferably from about 1 to about 25 carbon atoms, and particularly preferred from about 1 to about 12 carbon atoms; b) a substituted aliphatic group having from about 1 to about 50 carbon atoms, preferably from about 1 to about 25 carbon atoms, and particularly preferred from about 1 to about 12 carbon atoms, wherein the substituents include aromatic groups having from about 6 to about 30 carbon atoms; and c) a substituted or unsubstituted aromatic group having from about 6 to about 30 carbon atoms, wherein the substituents can be further substituted as described above.

In a particularly preferred embodiment of the invention, $R_1$, is an allyl having from about 2 to about 50 carbon atoms, preferably from about 2 to about 25 carbon atoms, and particularly preferred from about 1 to about 12 carbon atoms.

In an embodiment of the invention, the unsaturated carbonate adhesive has the following Formula II:

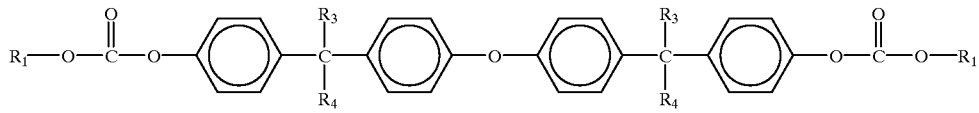

wherein $R_1$ is defined as above, and $R_3$ and $R_4$ are the same or different and are selected from a substituted or unsubstituted aliphatic group having, for example, from about 1 to about 50 carbon atoms, preferably from about 1 to about 25 carbon atoms, and particularly preferred from about 1 to about 12 carbon atoms such as, for example, methyl, ethyl, propyl, butyl, penyl, hexyl, heptyl, octyl, nonyl, decyl and the like, wherein the substituents include any appropriate group such as aliphatic groups having, for example from about 1 to about 50 carbons, preferably from about 1 to about 25 carbons, and particularly preferred from about 1 to about 12 carbons such as methyl, ethyl, propyl, butyl, penyl, hexyl, heptyl, octyl, nonyl, decyl and the like, cycloaliphatic groups having, for example, from about 3 to about 28 carbon atoms, preferably from about 3 to about 16 carbon atoms such as, for example, cyclopropyl, cyclobutyl, cyclopentyl, cyclohexyl, cycloheptyl, cyclooctyl, cyclononyl, cyclodecyl, and the like, halides such as bromo, chloro, fluoro, iodo, and the like, aromatic groups having, for example, from about 6 to about 30 carbons, preferably from about 6 to about 18 carbon atoms such as cyclohexene, cyclohexadiene, cyclohexatriene, benzene and the like, nitro groups, amino groups, amido groups, sulfonyl groups, cyano groups, and the like.

Specific examples of unsaturated carbonate adhesives falling within the scope of the above Formula I include CR-39®, CR-406 and HIRI™, all of which are available from PPG Industries, Inc. In an even further preferred embodiment of the invention, the unsaturated carbonate adhesive is an allyl diglycol carbonate material has the following Formula III:

the unsaturated carbonate adhesive is used with substrates and/or coating layers of the belt, comprising either a carbonyl functional group in the polymer structure, or comprising monomeric carbonates and/or oligomeric polycarbonates.

Moreover, the unsaturated carbonate adhesive crosslinks when a crosslinking agent is added therewith. Use of such a crosslinkable adhesive is superior to known solvent adhesives in that a solvent is not necessary. In addition, by use of a solvent with known adhesives, the dissolved adhesive when placed between the crevice of a belt seam tends to shrink, due to loss of solvent during drying process, causing less smoothness at the seam. In addition, known solvents tend to be reactive with the polymer materials of the belt causing the belt materials to dissolve or become otherwise unstable. The unsaturated carbonate adhesive, on the other hand, when applied over the void or crevice of the belt seam acts similar to capillary action, and is easily drawn into the crevice by capillary action to bond the two ends of the belt together thereby forming a uniform, smooth seam joint. There is no solvent to evaporate, and therefore the occurrence of shrinkage of the seam is reduced or eliminated by use of the adhesive as described herein. Moreover, the crosslinking action and bond formation reduces the time needed for a solvent to evaporate, thereby reducing belt manufacturing cycle time and promoting cost savings.

A typical procedure of adhesive preparation is to dissolve a suitable crosslinking agent into a low viscosity unsaturated carbonate monomer liquid to form a low viscosity adhesive solution. When applied to the crevice of a seam, preferably a puzzle cut seam, through a syringe, the adhesive solution is easily drawn into the crevice and completely fills up the

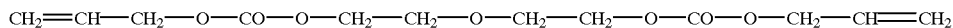

The above material of Formula III is an allyl diglycol carbonate monomer. Specifically, diethylene glycol bis allyl carbonate is commercially available from PPG Industries as CR-39®.

In another preferred embodiment of the invention, the unsaturated carbonate adhesive is an allyl diglycol carbonate monomer having the following Formula IV:

void by capillary action. Upon exposure to a mild elevation of temperature, the liquid adhesive solution, which fills the crevice, is spontaneously crosslinked into a three dimensional solid network without exhibiting substantial material shrinkage.

Examples of suitable crosslinking agents for the unsaturated carbonate monomer include diisopropyl

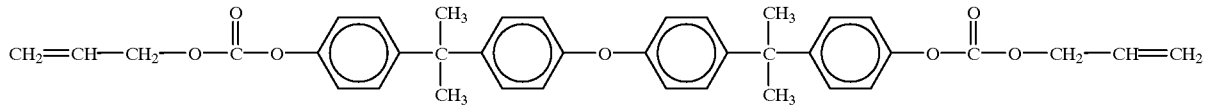

The above adhesive of Formula IV is available as HIRI™ from PPG Industries, Inc.

Preferably, the unsaturated carbonate adhesive is one having a relatively low viscosity of from about 0.3 to about 100 centipoise to facilitate the ease of filling the puzzle cut crevice by simple capillary action.

The unsaturated adhesive provides excellent reactivity with polymers having similar chemistry. In an embodiment, peroxydicarbonate, benzol peroxide, secondary butyl peroxydicarbonate, dicyclohexyl peroxydicarbonate, O,O-t-butyl-ethyl hexyl peroxycarbonate, t-butylperoxy isopropyl carbonate, and the like.

Moderate heating of the adhesive once placed in the seam crevice also increases the crosslinking/solidification reaction and increases the seam processing and belt fabrication speed. Desired temperature includes from about 40 to about 100° C., preferably from about 40 to about 85° C., at a time of from about 30 seconds to about 10 hours, preferably from about 30 minutes to about 5 hours. It is preferred that the temperature selected for heating not exceed 85° C., since the glass transition temperature, Tg, of the charge transport layer is about 85° C. Such a high temperature may cause the polyethylene substrate to exhibit dimensional shrinkage and thereby alter the photoreceptor belt's circumference.

Figure 9:
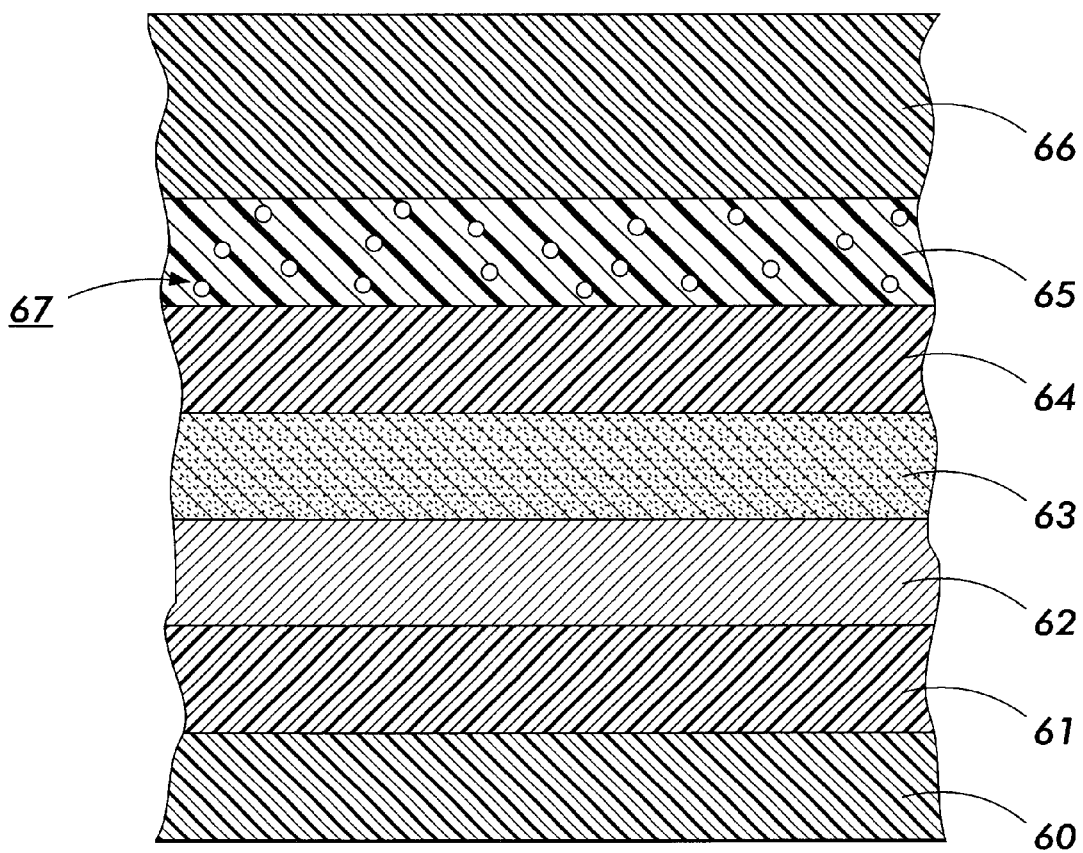
FIG. 9 is an enlarged cross-sectional view of a belt according to a preferred embodiment of the invention and demonstrates a seven layer photoreceptor belt.

An example of a preferred belt used in combination with the unsaturated carbonate adhesive is a layered photoreceptor belt, as depicted in FIG. 9. The belt comprises the following layers in the following order. A substrate 61 comprising a polyester, for example, polyethylene terephthalate is present in the seven layer photoreceptor belt. An anticurl backing layer 60 comprising a polymer such as polycarbonate is present on the underside of the substrate. On the upper side of the substrate 61 is present a conductive layer 62 comprising one or more metals, for example, zirconium on top of titanium. Present on the conductive layer 62 is a charge blocking layer 63 comprising an amino siloxane, such as a siloxane formed from a gamma aminopropyl triethoxy silane. Present on the charge blocking layer 63 is an adhesive layer 64 which may comprise an interfacial layer such as polyester. Present on the adhesive layer 64 is charge generating layer 65 comprising particles 67 dispersed in a film forming polymer, for example crystal particles such as trigonal selenium particles dispersed in a film forming binder. Present on the layer 65 is a charge transport layer 66 which can comprise a polymer such as polycarbonate in combination with a small molecule such as an aryl amine.

Note that the unsaturated carbonate is similar in structure to the polycarbonate layers such as the small molecule transport layer and anticurl backing layer. Therefore, the unsaturated carbonate adhesive is chemically similar and easily reactive with these layers.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

Preparation of Photoreceptor Belt

An electrophotographic imaging member web was prepared by providing a roll of titanium coated biaxially oriented thermoplastic polyester (MELINEX® 442, available from ICI Americas, Inc.) substrate having a thickness of about 3 mils (76.2 micrometers) and applying thereto, using a gravure applicator, a solution containing 50 parts by weight 3-aminopropyltriethoxysilane, 50.2 parts by weight distilled water, 15 parts by weight acetic acid, 684.8 parts by weight of 200 proof denatured alcohol, and 200 parts by weight heptane. This layer was then dried to a maximum temperature of 290° F. (143.3° C.) in a forced air oven. The resulting blocking layer had a dry thickness of about 0.05 micrometers.

An adhesive interface layer was then prepared by applying to the blocking layer a wet coating containing 5 percent by weight, based on the total weight of the solution, of polyester adhesive (MOR-ESTER® 49,000, available from Morton International, Inc.) in a 70:30 volume ratio mixture of tetrahydrofuran/cyclohexanone. The adhesive interface layer was dried to a maximum temperature of 275° F. (135° C.) in a forced air oven. The resulting adhesive interface layer had a dry thickness of about 0.07 micrometers.

The adhesive interface layer was thereafter coated with a photogenerating layer containing 7.5 percent by weight volume trigonal selenium, 25 percent by volume N,N'-diphenyl-N,N'-bis(3-methylphenyl)-1,1'biphenyl-4,4'-diamine, and 67.5 percent by volume polyvinylcarbazole. This photogenerating layer was prepared by introducing 160 grams polyvinylcarbazole and 2,800 mls of a 1:1 volume ratio of a mixture of tetrahydrofuran and toluene into a 400 oz. amber bottle. To this solution was added 160 grams of trigonal selenium and 20,000 gms of ⅛ inch (3.2 millimeters) diameter stainless steel shot. This mixture was then placed on a ball mill for from about 72 to about 96 hours. Subsequently, 500 grams of the resulting slurry were added to a solution of 36 grams of polyvinylcarbazole and 20 grams of N,N'-diphenyl-N,N'-bis(3-methylphenyl)-1, 1'biphenyl-4,4'-diamine dissolved in 750 mls of 1:1 volume ratio of tetrahydrofuran/toluene. This slurry was then placed on a shaker for 10 minutes. The resulting slurry was thereafter applied to the adhesive interface by extrusion coating to form a layer having a wet thickness of about 0.5 mil (12.7 micrometers). However, a strip about 3 mm wide along one edge of the coating web, having the blocking layer and adhesive layer, was deliberately left uncoated without any of the photogenerating layer material to facilitate adequate electrical contact by the ground strip layer that is applied later. This photogenerating layer was dried to a maximum temperature of 280° F. (138° C.) in a forced air oven to form a dry thickness photogenerating layer having a thickness of about 2.0 micrometers.

This coated imaging member web was simultaneously overcoated with a charge transport layer and a ground strip layer by co-extrusion of the coating materials. The charge transport layer was prepared by introducing into an amber glass bottle in a weight ratio of 1:1 N,N'-diphenyl-N,N'-bis (3-methylphenyl)-1,1'biphenyl-4,4'-diamine and MAKROLON® 5705, a polycarbonate resin having a molecular weight of about 120,000 and commercially available from Farbensabricken Bayer A.G. The resulting mixture was dissolved to give 15 percent by weight solid in methylene chloride. This solution was applied on the photogenerating layer by extrusion to form a coating which upon drying gave a thickness of about 24 micrometers.

The strip, about 3 mm wide, of the adhesive layer left uncoated by the photogenerator layer, was coated with a ground strip layer during the co-extrusion process. The ground strip layer coating mixture was prepared by combining 23.81 grams of polycarbonate resin (MAKROLON® 5705, 7.87 percent by total weight solids, available from Bayer A.G.), and 332 grams of methylene chloride in a carboy container. The container was covered tightly and placed on a roll mill for about 24 hours until the polycarbonate was dissolved in the methylene chloride the resulting solution was mixed for from about 15 to about 30 minutes with about 93 grams of graphite dispersion (12.3 percent by weight solids) of 9.41 parts by weight graphite, 2.87 parts by weight ethyl cellulose and 87.7 parts by weight solvent (Acheson Graphite dispersion RW22790, available from Acheson Colloids Company) with the aid of a high shear blade dispersed in a water cooled, jacketed container to prevent the dispersion from overheating and losing solvent. The resulting dispersion was then filtered and the viscosity was adjusted with the aid of methylene chloride. This ground strip coating mixture was then applied, by co-extrusion with the charge transport layer, to the electrophotographic imaging member web to form an electrically conductive ground strip layer having a dried thickness of about 14 micrometers.

The resulting imaging member web containing all of the above layers was then passed through a maximum temperature zone of 240° F. (116° C.) in a forced air oven to simultaneously dry both the charge transport layer and the ground strip.

An anti-curl coating was prepared by combining 88.2 grams of polycarbonate resin (MAKROLON® 5705, available from Goodyear Tire and Rubber Company) and 900.7 grams of methylene chloride in a carboy container to form a coating solution containing about 8.9 percent solids. The container was covered tightly and placed on a roll mill for about 24 hours until the polycarbonate and polyester were dissolved in the methylene chloride. An amount of 4.5 grams of silane-treated microcrystalline silica was dispersed in the resulting solution with a high shear dispersion to form the anti-curl coating solution. The anti-curl coating solution was then applied to the rear surface (side opposite the photogenerator layer and charge transport layer) of the electrophotographic imaging member web by extrusion coating and dried to a maximum temperature of 220° F. (104° C.) in a forced air oven to product a dried coating layer having a thickness of 13.5 micrometers.

Example II

Use of Unsaturated Carbonate Adhesive

An amount of 50 grams of liquid diethylene glycol bis (allyl carbonate), CR-39® available from PPG Industries, Inc., having a viscosity of 17.25 centipoise was dissolved with 0.16 grams of diisopropyl peroxydicarbonate (IPP also available from PPG Industries, Inc.) to give a 3 percent by weight crosslinking agent in the liquid solution. The solution was then applied over a 3 mil 11 inch by 9 inch biaxally oriented polyester substrate (MELINEX® 442, available from ICI Americas, Inc.) by a hand coating method using a ½ mil gap Bird applicator. The coated sample was annealed at 70° C. for about 2 hours in an air circulating oven to yield a crosslinked film of about 12 micrometers over the polyester substrate.

The sample with the crosslinked allyl carbonate coating was tested for its adhesion over the polyester substrate. A cross hatch pattern was formed on the coating layer by cutting through the thickness of the coating with a razor blade. A cross hatch pattern was formed on the coating layer by cutting through the thickness of the coating with a razor blade. The cross hatch pattern consisted of perpendicular slices about 5 mm apart to form tiny separate squares of the carbonate coating layer. A ¾ inch width adhesive tape Scotch Brand Magic Tape #810, available from 3M Corporation, was then pressed against the coating layer, and thereafter peeled from the coating to determine the adhesive bond strength between the coating layer and the polyester substrate. After application of the tape, the tape was peeled away in a direction perpendicular to the surface of the cross-hatch cutting layer. Peeling off of the tape was not observed to remove any of the cross hatch pattern from the substrate, demonstrating good adhesion bonding was formed at the coating/substrate interface.

Example III

Use of Unsaturated Carbonate Adhesive

Two 11 inch by 9 inch imaging member sheets were cut from the electrophotographic imaging member web of Example I. One imaging member sheet was applied with the allyl carbonate solution following the procedure as described in Example II, over the charge transport layer. The other imaging member sheet was similarly applied with the allyl carbonate solution but onto the anti-curl backing layer. After curing the allyl carbonate at elevated temperature to complete the crosslinking process, each applied allyl carbonate was fused into an integral part of its respective contacting surfaces (the charge transport layer surface and the anti-curl backing layer surface), indicating that excellent cohesive bonding was created by the chemical similarity between the allyl carbonate coating and the polycarbonate matrix of charge transport layer and the anti-curl bonding layer of the imaging member.

Example IV

Use of Puzzle Cut Seam and No Adhesive at Bond Belt Seam

The electrophotographic imaging member web of Example I having a width of 353 millimeters, was cut into a rectangular sheet of about 559.5 millimeters in length. The opposite ends of each imaging member were overlapped 1 mm and joined by an ultrasonic energy seam welding process using a 40 Khz horn frequency to form a seamed electrophotographic imaging member belt.

The ultrasonically welded belt had two 0.75 mm seam splashes, one on the top surface of the belt over the charge transport layer while the other on the top surface inside belt over the anti-curl backing layer, adjacent the 1 mm overlapped seam. The welded seam had a 75 micrometers added thickness than that of the main body of the belt when measured with a micrometer. This ultrasonic welded seam represents a known seam design.

Example V

Use of Unsaturated Adhesive to Bond Puzzle Cut Seam

A 353 mm by 559 mm electrophotographic imaging member belt, using the imaging member web of Example I, may be prepared by first cutting the two ends of an imaging member sheet with a puzzle cut die U.S. Pat. application Ser. No. 08/721,418 entitled, "Process and Apparatus for Producing an Endless Seamed Belt") for example of puzzle cut die apparatus) to give corresponding matching puzzle cut patterns. These puzzle cut members may be placed together or mated to provide mechanical interlocking of the puzzle cut patterns. Subsequently, an allyl diglycol carbonate adhesive such as CR-39 from PPG Industries, can be filled into the mated puzzle cut crevice by injecting the adhesive with a syringe into or over the crevice to facilitate capillary action. Excess carbonate solution is wiped clean with tissue paper. The allyl carbonate filled puzzle cut seam can then be exposed to heat for curing at a temperature of about 70° C. to accelerate the polymerization/crosslinking reaction which converts the liquid carbonate into a solid. The resulting adhesion bonded puzzle cut invention seam is estimated to have nil added seam thickness.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An endless seamed flexible belt comprising a first end and a second end together which form a seam, wherein said seam comprises a product obtained from curing a crosslinkable unsaturated carbonate adhesive material having the following Formula I: $R_1$—O—$CO_2$—$R_2$—O—$R_2$—$CO_2$—O—$R_1$, wherein $R_1$ is an unsaturated chain having from about 2 to about 40 carbon atoms, and wherein $R_2$ is different from $R_1$ and is selected from the group consisting of a) a nonsubstituted aliphatic chain having from about 1 to about 50 carbon atoms, b) a substituted aliphatic chain having from about 1 to about 50 carbon atoms, c) an unsubstituted aromatic group having form about 6 to about 30 carbon atoms, d) a substituted aromatic group having from about 6 to about 30 carbon atoms, e) unsubstituted heterocyclic group having from about 3 to about 40 carbons, and f) substituted heterocyclic group having from about 3 to about 40 carbons, wherein said substituents are selected from the group consisting of aliphatic groups having from about 1 to about 50 carbons, cycloaliphatic groups having from about 3 to about 28 carbons, halides, aromatic groups having from about 6 to about 30 carbons, nitro groups, amino groups, amido groups, cyano groups, and sulfonyl groups wherein the resulting crosslinked carbonate adhesive is depleted of crosslinkable unsaturations, and wherein the resulting seamed flexible belt is free of a thickness differential between the seamed portion of the belt and the adjacent main body of the belt.

2. An endless seamed flexible belt comprising a first end and a second end together which form a seam, wherein said seam comprises a product obtained from curing a crosslinkable unsaturated carbonate adhesive material having the following Formula I: R1-O—CO2-R2—O—R2-CO2—O—R1, wherein R1 is an unsaturated chain having from about 2 to about 40 carbon atoms, and wherein R2 is different from R1 and is selected from the group consisting of a) a nonsubstituted aliphatic chain having from about 1 to about 50 carbon atoms, b) a substituted aliphatic chain having from about 1 to about 50 carbon atoms, c) an unsubstituted aromatic group having form about 6 to about 30 carbon atoms, d) a substituted aromatic group having from about 6 to about 30 carbon atoms, e) unsubstituted heterocyclic group having from about 3 to about 40 carbons, and f) substituted heterocyclic group having from about 3 to about 40 carbons, wherein said substituents are selected from the group consisting of aliphatic groups having from about 1 to about 50 carbons, cycloaliphatic groups having from about 3 to about 28 carbons, halides, aromatic groups having from about 6 to about 30 carbons, nitro groups, amino groups, amido groups, cyano groups, and sulfonyl groups, and wherein R1 is selected from the group consisting of an alkenyl chain having from about 2 to about 50 carbon atoms and an alkynyl chain having from about 2 to about 50 carbon atoms wherein the resulting crosslinked carbonate adhesive is depleted of crosslinkable unsaturations, and wherein the resulting seamed flexible belt is free of a thickness differential between the seamed portion of the belt and the adjacent main body of the belt.

3. A belt in accordance with claim 2, wherein said alkenyl chain has from about 2 to about 25 carbon atoms and said alkynyl has from about 2 to about 25 carbon atoms.

4. A belt in accordance with claim 2, wherein $R_1$ is an allyl having from about 2 to about 25 carbon atoms.

5. A belt in accordance with claim 4, wherein $R_1$ is an allyl having from about 2 to about 12 carbon atoms.

6. A belt in accordance with claim 2, wherein $R_2$ is an unsubstituted aliphatic group having from about 1 to about 50 carbon atoms.

7. A belt in accordance with claim 6, wherein $R_2$ is an unsubstituted aliphatic group having from about 1 to about 25 carbon atoms.

8. A belt in accordance with claim 2, wherein $R_2$ is a substituted aliphatic group having from about 1 to about 50 carbon atoms, wherein said substituents are selected from the group consisting of aliphatic groups having from about 1 to about 50 carbons, cycloaliphatic groups having from about 3 to about 28 carbons, halides, aromatic groups having from about 6 to about 30 carbons, nitro groups, amino groups, amido groups, cyano groups, and sulfonyl groups.

9. A belt in accordance with claim 8, wherein $R_2$ is a substituted aliphatic group having from about 1 to about 25 carbon atoms, wherein said substituents are selected from the group consisting of aliphatic groups having from about 1 to about 25 carbons and aromatic groups having from about 6 to about 30 carbons.

10. A belt in accordance with claim 2, wherein $R_2$ is a substituted aromatic group having from about 6 to about 30 carbon atoms, wherein said substituents are selected from the group consisting of aliphatic groups having from about 1 to about 50 carbons, cycloaliphatic group having from about 3 to about 28 carbons, halides, aromatic groups having from about 6 to about 30 carbons, nitro groups, amino groups, amido groups, cyano groups, and sulfonyl groups.

11. A belt in accordance with claim 2, wherein said unsaturated carbonate material is of a formula selected from the group consisting of the following Formula III: $O(CH_2$—$CH_2$—O—$CO_2$—O—$CH_2$—$CH=CH_2)_2$ and the following Formula IV:

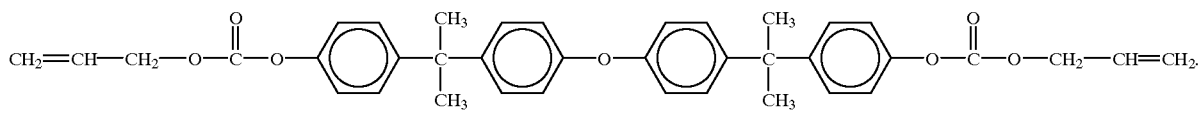

12. A belt in accordance with claim 4, wherein $R_1$ comprises methylene, ethene, propene, butene, pentene, hexene, heptene, octene, nonene, or decene, and ethyne, propyne, butyne, pentyne, hexyne, heptyne, octyne, nonyne, or decyne.

13. A belt in accordance with claim 12, wherein $R_1$ is butene.

14. A belt in accordance with claim 12, wherein $R_1$ is decene.

15. A belt in accordance with claim 12, wherein $R_1$ is ethyne.

16. A belt in accordance with claim 12, wherein $R_1$ is octyne.

17. A belt in accordance with claim 10 wherein $R_2$ is, methyl, ethyl, propyl, butyl, penyl, hexyl, heptyl, octyl, nonyl, or decyl.

18. A belt in accordance with claim 10, wherein $R_2$ is a substituted aliphatic group, wherein said cycloaliphatic group comprises cyclopropyl, cyclobutyl, cyclopentyl, cyclohexyl, cycloheptyl, cyclooctyl, cyclononyl, or cyclodecyl.

* * * * *